United States Patent
Pope et al.

(10) Patent No.: US 11,392,429 B2
(45) Date of Patent: **\*Jul. 19, 2022**

(54) MODIFYING APPLICATION BEHAVIOUR

(71) Applicant: XILINX, INC., San Jose, CA (US)

(72) Inventors: Steven L. Pope, Cambridge (GB);
David J. Riddoch, Huntingdon (GB);
Kieran Mansley, Girton (GB)

(73) Assignee: XILINX, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,535

(22) Filed: Jan. 15, 2019

(65) Prior Publication Data
US 2019/0146855 A1    May 16, 2019

Related U.S. Application Data

(63) Continuation of application No. 14/250,290, filed on Apr. 10, 2014, now Pat. No. 10,713,099, which is a
(Continued)

(51) Int. Cl.
*G06F 9/54* (2006.01)
(52) U.S. Cl.
CPC .............. *G06F 9/541* (2013.01); *G06F 9/546* (2013.01); *G06F 2209/542* (2013.01)
(58) Field of Classification Search
None
See application file for complete search history.

(56) References Cited

U.S. PATENT DOCUMENTS 5,272,599 A   12/1993   Koenen
5,325,532 A    6/1994   Crosswy et al.
(Continued)

FOREIGN PATENT DOCUMENTS

EP        620521 A2     10/1994
WO     2001048972 A1     7/2001
(Continued)

OTHER PUBLICATIONS

Montry G., OpenFabrics Alliance presentation slides, 14th Symposium on High Performance Interconnects, Aug. 23, 2006, 8pp.
(Continued)

*Primary Examiner* — Doon Y Chow
*Assistant Examiner* — Phuong N Hoang
(74) *Attorney, Agent, or Firm* — Haynes Beffel & Wolfeld LLP; Andrew Dunlap

(57) ABSTRACT

A data processing system comprising: an operating system providing an application programming interface; an application supported by the operating system and operable to make calls to the application programming interface; an intercept library configured to intercept calls of a predetermined set of call types made by the application to the application programming interface; and a configuration data structure defining at least one action to be performed for each of a plurality of sequences of one or more calls having predefined characteristics, the one or more calls being of the predetermined set of call types; wherein the intercept library is configured to, on intercepting a sequence of one or more calls defined in the configuration data structure, perform the corresponding action(s) defined by the configuration data structure.

35 Claims, 3 Drawing Sheets

Related U.S. Application Data continuation of application No. 13/283,423, filed on Oct. 27, 2011, now Pat. No. 8,763,018.

(60) Provisional application No. 61/525,980, filed on Aug. 22, 2011.

(56) References Cited

U.S. PATENT DOCUMENTS

| | | | |
|---|---|---|---|
| 5,568,487 A * | 10/1996 | Sitbon | H04L 29/06 370/466 |
| 5,652,879 A | 7/1997 | Harris et al. | |
| 5,721,876 A | 2/1998 | Yu et al. | |
| 5,771,388 A | 6/1998 | Mondrik et al. | |
| 5,946,189 A | 8/1999 | Koenen et al. | |
| 6,012,084 A | 1/2000 | Fielding et al. | |
| 6,098,112 A | 8/2000 | Ishijima et al. | |
| 6,160,554 A | 12/2000 | Krause | |
| 6,304,945 B1 | 10/2001 | Koenen | |
| 6,349,035 B1 | 2/2002 | Koenen | |
| 6,438,130 B1 | 8/2002 | Kagan et al. | |
| 6,502,203 B2 | 12/2002 | Barron et al. | |
| 6,530,007 B2 | 3/2003 | Olarig et al. | |
| 6,667,918 B2 | 12/2003 | Leader et al. | |
| 6,718,362 B1 | 4/2004 | Beadle et al. | |
| 6,718,392 B1 | 4/2004 | Krause | |
| 6,728,743 B2 | 4/2004 | Shachar | |
| 6,735,642 B2 | 5/2004 | Kagan et al. | |
| 6,768,996 B1 | 7/2004 | Steffens et al. | |
| 6,823,504 B1 * | 11/2004 | Sokolov | G06F 9/45508 717/136 |
| 6,826,523 B1 | 11/2004 | Guy et al. | |
| 6,904,534 B2 | 6/2005 | Koenen | |
| 6,950,961 B2 | 9/2005 | Krause et al. | |
| 6,963,905 B1 | 11/2005 | Melman | |
| 6,978,331 B1 | 12/2005 | Kagan et al. | |
| 7,051,084 B1 | 5/2006 | Hayton et al. | |
| 7,065,574 B1 | 6/2006 | Saulpaugh et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,216,225 B2 | 5/2007 | Haviv et al. | |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,285,996 B2 | 10/2007 | Fiedler | |
| 7,316,017 B1 | 1/2008 | Jacobson et al. | |
| 7,346,702 B2 | 3/2008 | Haviv | |
| 7,386,619 B1 | 6/2008 | Jacobson et al. | |
| 7,403,535 B2 | 7/2008 | Modi et al. | |
| 7,404,190 B2 | 7/2008 | Krause et al. | |
| 7,502,826 B2 | 3/2009 | Barron et al. | |
| 7,509,355 B2 | 3/2009 | Hanes et al. | |
| 7,518,164 B2 | 4/2009 | Smelloy et al. | |
| 7,551,614 B2 | 6/2009 | Teisberg et al. | |
| 7,554,993 B2 | 6/2009 | Modi et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,631,106 B2 | 12/2009 | Goldenberg et al. | |
| 7,636,703 B2 | 12/2009 | Taylor | |
| 7,650,386 B2 | 1/2010 | McMahan et al. | |
| 7,653,754 B2 | 1/2010 | Kagan et al. | |
| 7,688,853 B2 | 3/2010 | Santiago et al. | |
| 7,702,629 B2 | 4/2010 | Cytron et al. | |
| 7,742,429 B1 | 6/2010 | Huang et al. | |
| 7,756,984 B2 | 7/2010 | Burr et al. | |
| 7,757,232 B2 | 7/2010 | Hilland et al. | |
| 7,801,027 B2 | 9/2010 | Kagan et al. | |
| 7,802,071 B2 | 9/2010 | Oved | |
| 7,813,460 B2 | 10/2010 | Fiedler | |
| 7,827,442 B2 | 11/2010 | Sharma et al. | |
| 7,835,375 B2 | 11/2010 | Sarkinen et al. | |
| 7,848,322 B2 | 12/2010 | Oved | |
| 7,856,488 B2 | 12/2010 | Cripe et al. | |
| 7,864,787 B2 | 1/2011 | Oved | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,930,437 B2 | 4/2011 | Kagan et al. | |
| 7,934,959 B2 | 5/2011 | Rephaeli et al. | |
| 7,945,528 B2 | 5/2011 | Cytron et al. | |
| 7,954,114 B2 | 5/2011 | Chamberlain et al. | |
| 7,978,606 B2 | 7/2011 | Buskirk et al. | |
| 8,000,336 B2 | 8/2011 | Harel | |
| 8,156,101 B2 | 4/2012 | Indeck et al. | |
| 8,326,816 B2 | 12/2012 | Colle et al. | |
| 8,341,134 B2 | 12/2012 | Bourbonnais et al. | |
| 8,346,999 B2 | 1/2013 | Dubai et al. | |
| 8,763,018 B2 | 6/2014 | Pope et al. | |
| 8,966,112 B1 * | 2/2015 | Franke | H04L 69/321 370/229 |
| 2002/0026534 A1 * | 2/2002 | Buzbee | G06F 9/542 719/318 |
| 2002/0059052 A1 | 5/2002 | Bloch et al. | |
| 2002/0062287 A1 * | 5/2002 | Katz | G06Q 30/0603 705/51 |
| 2002/0065945 A1 * | 5/2002 | Calder | G06F 21/54 719/313 |
| 2002/0091863 A1 | 7/2002 | Schug | |
| 2002/0099827 A1 | 7/2002 | Shah et al. | |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0156784 A1 | 10/2002 | Hanes et al. | |
| 2003/0005122 A1 | 1/2003 | Freimuth et al. | |
| 2003/0007165 A1 | 1/2003 | Hudson | |
| 2003/0033588 A1 | 2/2003 | Alexander | |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0081060 A1 | 5/2003 | Zeng et al. | |
| 2003/0086300 A1 | 5/2003 | Noyes et al. | |
| 2003/0172330 A1 | 9/2003 | Barron et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2004/0015502 A1 | 1/2004 | Alexander et al. | |
| 2004/0031044 A1 | 2/2004 | Jones | |
| 2004/0071250 A1 | 4/2004 | Bunton et al. | |
| 2004/0088423 A1 | 5/2004 | Miller et al. | |
| 2004/0117485 A1 | 6/2004 | Yang | |
| 2004/0141642 A1 | 7/2004 | Zeng et al. | |
| 2004/0190533 A1 | 9/2004 | Modi et al. | |
| 2004/0190538 A1 | 9/2004 | Bunton et al. | |
| 2004/0190557 A1 | 9/2004 | Barron | |
| 2004/0193734 A1 | 9/2004 | Barron et al. | |
| 2004/0193825 A1 | 9/2004 | Garcia et al. | |
| 2004/0210754 A1 | 10/2004 | Barron et al. | |
| 2004/0249957 A1 | 12/2004 | Ekis et al. | |
| 2004/0252685 A1 | 12/2004 | Kagan et al. | |
| 2004/0268367 A1 * | 12/2004 | Roe | G06F 9/541 719/318 |
| 2005/0008223 A1 | 1/2005 | Zeng et al. | |
| 2005/0018221 A1 | 1/2005 | Zeng et al. | |
| 2005/0021680 A1 * | 1/2005 | Ekis | G06F 9/5044 709/219 |
| 2005/0038918 A1 | 2/2005 | Hilland et al. | |
| 2005/0038941 A1 | 2/2005 | Chadalapaka et al. | |
| 2005/0039171 A1 | 2/2005 | Avakian et al. | |
| 2005/0039172 A1 | 2/2005 | Rees et al. | |
| 2005/0039187 A1 | 2/2005 | Avakian et al. | |
| 2005/0066333 A1 | 3/2005 | Krause et al. | |
| 2005/0076237 A1 * | 4/2005 | Cohen | G06F 9/468 726/4 |
| 2005/0172181 A1 | 8/2005 | Huliehel | |
| 2005/0219278 A1 | 10/2005 | Hudson | |
| 2005/0219314 A1 | 10/2005 | Donovan et al. | |

(56) References Cited

U.S. PATENT DOCUMENTS

| | | |
|---|---|---|
| 2005/0231751 A1 | 10/2005 | Wu et al. |
| 2006/0026443 A1 | 2/2006 | McMahan et al. |
| 2006/0045096 A1 | 3/2006 | Farmer et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0124463 A1 | 5/2007 | Madhavapeddi et al. |
| 2007/0174846 A1* | 7/2007 | Johnson ............. G06F 9/542 719/318 |
| 2007/0188351 A1 | 8/2007 | Brown et al. |
| 2007/0220183 A1 | 9/2007 | Kagan et al. |
| 2007/0237327 A1 | 10/2007 | Taylor et al. |
| 2007/0255866 A1 | 11/2007 | Aloni et al. |
| 2007/0260602 A1 | 11/2007 | Taylor |
| 2007/0277036 A1 | 11/2007 | Chamberlain et al. |
| 2008/0024586 A1 | 1/2008 | Barron |
| 2008/0065839 A1* | 3/2008 | Pope ............. G06F 9/544 711/152 |
| 2008/0072236 A1 | 3/2008 | Pope et al. |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0240130 A1* | 10/2008 | Oved ............. G06F 9/541 370/401 |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0060197 A1 | 3/2009 | Taylor et al. |
| 2009/0150873 A1 | 6/2009 | Taneda |
| 2009/0165003 A1 | 6/2009 | Jacobson et al. |
| 2009/0182683 A1 | 7/2009 | Taylor et al. |
| 2009/0201926 A1 | 8/2009 | Kagan et al. |
| 2009/0204981 A1 | 8/2009 | Karino et al. |
| 2009/0213856 A1 | 8/2009 | Paatela et al. |
| 2009/0265414 A1 | 10/2009 | Bryan |
| 2009/0268612 A1 | 10/2009 | Felderman et al. |
| 2009/0287628 A1 | 11/2009 | Indeck et al. |
| 2009/0296685 A1 | 12/2009 | O'Shea et al. |
| 2009/0302923 A1 | 12/2009 | Smeloy et al. |
| 2010/0057932 A1* | 3/2010 | Pope ............. H04L 69/32 709/236 |
| 2010/0088437 A1 | 4/2010 | Zahavi |
| 2010/0138840 A1 | 6/2010 | Kagan et al. |
| 2010/0169880 A1 | 7/2010 | Haviv et al. |
| 2010/0188140 A1 | 7/2010 | Smeloy |
| 2010/0189206 A1 | 7/2010 | Kagan |
| 2010/0198850 A1 | 8/2010 | Cytron et al. |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0040701 A1 | 2/2011 | Singla et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0184844 A1 | 7/2011 | Parsons et al. |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0182859 A1 | 7/2012 | Ikeda et al. |
| 2012/0246052 A1 | 9/2012 | Taylor et al. |
| 2013/0000000 A1 | 1/2013 | Lee |
| 2013/0055287 A1 | 2/2013 | Pope et al. |
| 2014/0165137 A1* | 6/2014 | Balinsky ............. G06F 21/554 726/1 |
| 2014/0304719 A1 | 10/2014 | Pope et al. |

FOREIGN PATENT DOCUMENTS

| | | |
|---|---|---|
| WO | 2002035838 A1 | 5/2002 |
| WO | 2008127672 A2 | 10/2008 |
| WO | 2009136933 A1 | 11/2009 |
| WO | 20099134219 A1 | 11/2009 |
| WO | 2010020907 A2 | 2/2010 |
| WO | 2010087826 A1 | 8/2010 |
| WO | 2011039985 A1 | 4/2011 |
| WO | 2011043769 A1 | 4/2011 |
| WO | 2011053305 A1 | 5/2011 |
| WO | 2011053330 A1 | 5/2011 |

OTHER PUBLICATIONS

U.S. Appl. No. 14/250,290—Office Action dated Apr. 6, 2015, 101 pages.

U.S. Appl. No. 14/250,290—Response to Office Action dated Apr. 6, 2015 filed Jul. 2, 2015, 17 pages.

U.S. Appl. No. 14/250,290—Final Office Action dated Oct. 14, 2015, 42 pages.

U.S. Appl. No. 14/250,290—Response to Final Office Action dated Oct. 14, 2016 filed Feb. 10, 2016, 18 pages.

U.S. Appl. No. 14/250,290—Office Action dated Aug. 30, 2016, 35 pages.

U.S. Appl. No. 14/250,290—Response to Office Action dated Aug. 30, 2016 filed Dec. 28, 2016, 15 pages.

U.S. Appl. No. 13/283,423—Preliminary Amendment filed Sep. 11, 2013, 14 pages.

U.S. Appl. No. 13/283,423—Office Action dated Sep. 19, 2013, 61 pages.

U.S. Appl. No. 13/283,423—Response to Office Action dated Sep. 19, 2013, filed Dec. 19, 2013, 18 pages.

U.S. Appl. No. 13/283,423—Notice of Allowance dated Feb. 20, 2014, 12 pages.

U.S. Appl. No. 14/250,290—Office Action dated May 3, 2017, 37 pages.

U.S. Appl. No. 14/250,290—Response to Office Action dated May 3, 2017, filed Aug. 8, 2017, 19 pages.

U.S. Appl. No. 14/250,290—Advisory Action dated Sep. 19, 2017, 8 pages.

U.S. Appl. No. 14/250,290—Response to Final Office Action dated May 3, 2017, filed Oct. 3, 2017, 16 pages.

U.S. Appl. No. 14/250,290—Office Action dated Feb. 15, 2018, 40 pages.

U.S. Appl. No. 14/250,290—Office Action dated Oct. 25, 2018, 20 pages.

U.S. Appl. No. 14/250,290—Response to Office Action dated Feb. 15, 2018 filed May 8, 2018, 18 pages.

U.S. Appl. No. 14/250,290—Response to Office Action dated Oct. 25, 2018 filed Jan. 23, 2019, 8 pages.

Shivam, P., et al., "EMP: Zero-copy OS-bypass NIC-driven Gigabit Ethernet Message Passing," Proc. 2001 ACM/IEEE Conf. on Supercomputing, Denver, Nov. 10, 20011, 8 pages.

Rangarajan, Murali, et al., "TCP Servers: Offloading TCP Processing in Internet Servers. Design, Implementation, and Performance," Technical Report DCR-TR-481, Computer Science Department, Rutgers University, Mar. 2, 2002, 14 pp.

Adiga, NR, et al., "An Overview of the BlueGene/L Supercomputer," Proceedings of the 2002 ACM/IEEE conference an Supercomputing, Baltimore, Nov. 16, 2002, pp. 1-22.

(56) References Cited

OTHER PUBLICATIONS

Steven J. Sistare, Christopher J. Jackson; "Ultra-High Performance Communication with MPI and the Sun Fire Link Interconnect," Proceedings of the 2002 ACM/IEEE conference on Supercomputing, p. 1-15, Baltimore; Nov. 16, 2002.
McAuley, Derek and Neugebauer, Rolf, "A case for virtual channel processors," NICELI '03 Proc.of the ACM SIGCOMM workshop, Aug. 2003, pp. 237-242.
Wu-chun Feng, et al.; "Optimizing 10-Gigabit Ethernet for Networks ofWorkstations, Clusters, and Grids: A Case Study," Proceedings of the 2003 ACM/IEEE conference on Supercomputing, Phoenix, Arizona, 13 pages, Nov. 15, 2003.
Cheng Jin, et al.; "FAST TCP: Motivation, Architecture, Algorithms, Performance," Proceedings of IEEE Infocom 2004, 21 pages, Mar. 7, 2004.
Greg Regnier, et al.; "TCP Onloading for Data Center Servers," Computer, IEEE Computer Society, vol. 37, No. 11, p. 48-58, Nov. 2004.
Balaji, P., et al., "Head-to TOE Evaluation of High-Performance Sockets over Protocol Offload Entines," Proceedings of the IEEE International Conference on Cluster Computing, Sep. 5, 2005, 10pp.
Bhandarkar, Sumitha, et al., "LTCP: Improving the Permormance of TCP in Highspeed Networks," ACM Computer Communication Review, vol. 36, No. 1, Jan. 6, 2006, pp. 41-50.
Geoffray, "Protocol Off-Loading vs On-Loading in High-Perfomance Networks," Hot Interconnects 2006, 14th Symposium on High Performance Interconnects, Aug. 23, 2006, 5 pages.
Wilkes, M.V. and Needham, R.M., "The Cambridge Model Distributed System," ACM SIGOPS Operating Systems Review, vol. 14, Issue 1, pp. 21-29, 1980, Jan. 1980.
Dickman, L., "Protocol OffLoading vs OnLoading in High Performance Networks," 14th Symposium on High Performance Interconnects, Aug. 23, 2006, 8pp.
Petrini, F., "Protocol Off-loading vs On-loading in High-Performance Networks," 14th Symposium on High Performance Interconnects, Aug. 23, 2006, 4pp.
Regnier G., "Protocol Onload vs. Offload," 14th Symposium on High Performance Interconnects, Aug. 23, 2006, 1pp.
U.S. Appl. No. 14/250,290—Notice of Allowance dated May 10, 2019, 9 pages.
Moore, Gordon E., Cramming more components onto integrated circuits, Electronics, vol. 38, No. 8, pp. 114-117, 1965, Apr. 19, 1965.
Dennis, Jack B. and Van Horn, Earl C., Programming Semantics for Multiprogrammed Computations, Communications of the ACM, vol. 9, No. 3, pp. 143-155, 1966, Mar. 1966.
Zelkowitz, Marvin, Communications of the ACM, vol. 14, No. 6, p. 417-418, 1971, Jun. 1971.
J. Carver Hill; "Synchronizing Processors with Memory-Content-Generated Interrupts," Communications of the ACM, vol. 16, No. 6, p. 350-351, Jun. 1973.
Kuo, F.F., "The ALOHA system," ACM Computer Communication Review, vol. 4 No. 1, 1974, Jan. 1974, pp. 5-8.
Cerf, Vinton and Kahn, Robert, A Protocol for Packet Network Intercommunication, IEEE Transactions on Communications, vol. COM-22, No. 5, pp. 637-648, 1974, May 1974.
Cerf, V., et al., Proposal for an International End to End Protocol, ACM Computer Communication Review, vol. 6 No. 1, 27 pages, 1976, Jan. 1976.
Metcalfe, Robert M. and Boggs, David R., Ethernet: Distributed Packet Switching for Local Computer Networks, Communications of the ACM, vol. 19, Issue 7, pp. 395-404, 1976, Jul. 1976.
Kermani, P. and Kleinrock, L., Virtual Cut-Through: A New Computer Communication Switching Technique, Computer Networks, vol. 3, No. 4, pp. 267-286, 1979, Sep. 1979.
McQuillan, John M., et al., An Overview of the New Routing Algorithm For the ARPANET, Proceedings of the 6th Data Communications Symposium, 7 pages, 1979, Nov. 1979.
Birrell, Andrew D., et al., Grapevine: An Exercise in Distributed Computing, Communications of the ACM, vol. 25, Issue 4, pp. 260-274, 1982, Apr. 1982.
Leslie, Ian M., et al., The Architecture of the Universe Network, ACM Computer Communication Review, vol. 14, No. 2, pp. 2-9, 1984, Jun. 1984.
Nagle, John, Congestion Control in IP/TCP Internetworks, ACM Computer Communication Review, vol. 14, No. 4, p. 11-17, 1984, Oct. 1984.
Brandriff, Robert K., et al.; "Development of a TCP/IP for the IBM/370," ACM SIGCOMM Computer Communication Review, vol. 15, No. 4, 1985, Sep. 1985, pp. 2-8.
Kline, C., "Supercomputers on the internet: a case study," ACM Computer Communication Review, vol. 17, No. 5, 1987, Aug. 1987, pp. 27-33.
Kent, Christopher A. and Mogul, Jeffrey C., Fragmentation Considered Harmful, ACM Computer Communication Review, vol. 17, No. 5, pp. 390-401, 1987, Oct. 1987.
Delp, Gary S., et al., An Analysis of Memnet: An Experiment in High-Speed Shared-Memory Local Networking, ACM Computer Communication Review, vol. 18, No. 4, p. 165-174, 1988, Aug. 1988.
Boggs, David R., et al., Measured Capacity of an Ethernet: Myths and Reality, ACM Computer Communication Review, vol. 18, No. 4, p. 222-234, 1988, Aug. 1988.
Kanakia, H. and Cheriton, D., The VMP Network Adapter Board (NAB): High-Performance Network Communication for Multiprocessors, ACM Computer Communication Review, vol. 18, No. 4, p. 175-187, 1988, Aug. 1988.
Jacobson, V., Congestion Avoidance and Control, ACM Computer Communication Review, vol. 18, No. 4, p. 314-329, 1988, Aug. 1988.
Clark, David D., The Design Philosophy of the DARPA Internet Protocols, ACM Computer Communication Review, vol. 18, No. 4, pp. 106-114, 1988, Aug. 1988.
Mockapetris, Paul V. and Dunlap, Kevin J., Development of the Domain Name System, ACM Computer Communication Review, vol. 18, No. 4, pp. 123-133, 1988, Aug. 1988.
Simmons, Margaret L. and Wasserman, Harvey J., Performance Comparison of the CRAY-2 and Cray X-MP/416 Supercomputers, Proceedings of the 1988 ACM/IEEE conference on Supercomputing, p. 288-295, Orlando, Florida, Nov. 12, 1988.
Borman, David A., Implementing TCP/IP on a Cray computer, ACM Computer Communication Review, vol. 19, No. 2, p. 11-15, 1989, Apr. 1989.
Braden, R., et al., Computing the Internet Checksum, ACM Computer Communication Review, vol. 19, No. 2, p. 86-94, 1989, Apr. 1989.
Clark, David D., et al., An Analysis of TCP Processing Overhead, IEEE Communications Magazine, vol. 27, No. 6, pp. 23-29, 1989, Jun. 1989.
Cheriton, David R., Sirpent: A High-Performance Internetworking Approach, ACM Computer Communication Review, vol. 19, No. 4, p. 158-169, 1989, Sep. 1989.
McAuley, Derek Robert, "Protocol Design for High Speed Networks," Ph D. Thesis, University of Cambridge, 1989, Sep. 1989, 104 pp.
Partridge, Craig, How Slow is One Gigabit Per Second?, ACM Computer Communication Review, vol. 20, No. 1, p. 44-53, 1990, Jan. 1990.
Clark, D. D. and Tennenhouse, D. L., Architectural Considerations for a New Generation of Protocols, ACM Computer Communication Review, vol. 20, No. 4, pp. 200-208, 1990, Sep. 1990.
Cooper, Eric C., et al., Protocol Implementation on the Nectar Communication Processor, ACM Computer Communication Review, vol. 20, No. 4, p. 135-144, 1990, Sep. 1990.
Davie, Bruce S., "A host-network interface architecture for ATM," ACM Computer Communication Review, vol. 21, No. 4, 1991, Sep. 1991, pp. 307-315.
Traw, C. Brendan S., et al.; ACM Computer Communication Review, vol. 21, No. 4, p. 317-325, 1991, Sep. 1991.

(56) References Cited

OTHER PUBLICATIONS

Leslie, Ian and McAuley, Derek R., Fairisle: An ATM Network for the Local Area, ACM Computer Communication Review, vol. 21, No. 4, p. 327-336, 1991, Sep. 1991.

Hayter, Mark and McAuley, Derek, The Desk Area Network, ACM Operating Systems Review, vol. 25, Issue 4, p. 14-21, 1991, Oct. 1991.

Finn, Gregory G., An Integration of Network Communication with Workstation Architecture, ACM Computer Communication Review, vol. 21, No. 5, p. 18-29, 1991, Oct. 1991.

Greg Chesson, "The Evolution of XTP," Proceedings of the Third International Conference on High Speed Networking, 1991, Nov. 1991, 10 pp.

Dixon, Michael J., "System support for multi-service traffic," University of Cambridge Computer Laboratory Technical Report No. 245, Jan. 1992, 113 pp.

Cohen, Danny; Finn, Gregory; Felderman, Robert; DeSchon, Annette; Made available by authors, Jan. 10, 1992, "Atomic: A Local Communication Network Created through Repeated Application of Multicomputing Components," 21 pp + cover.

Tsudik, "Message Authentication with One-Way Hash Functions," ACM Computer Communication Review, vol. 22, No. 5, pp. 29-38, Oct. 1992.

Steenkisie, Peter, "Analyzing communication latency using the Nectar communication processor," ACM Computer Communication Review, vol. 22, No. 4, 1992, Oct. 1992, pp. 199-209.

McKenney, Paul E. and Dove, Ken F., "Efficient demultiplexing of incoming TCP packets," ACM Computer Communication Review, vol. 22, No. 4, 1992, Oct. 1992, pp. 269-279.

Ruetsche, Erich and Kaiserswerth, Matthias, "TCP/IP on the parallel protocol engine," Proceedings of the IFIP TC6/WG6, 4 Fourth International Conference on High Performance Networking IV, Dec. 14, 1992, pp. 119-134.

Traw, C et al., Hardware/Software Organization of a High Performance ATM Host Interface, EEE Journal on Selected Areas in Communications, pp. 240-253, Feb. 1993.

Ruetsche, E., "The architecture of a Gb/s multimedia protocol adapter," ACM Computer Communication Review, vol. 23, No. 3, 1993, Jul. 1993, pp. 59-68.

Smith, Jonathan M. and Traw, C. Brendan S., Giving Applications Access to Gb/s Networking, IEEE Network, vol. 7, Issue 4, pp. 44-52, 1993, Jul. 1993, 14 pages.

Michel, Jeffrey R., "The Design and Evaluation of an Off-Host Communications Protocol Architecture," M.Sci. Thesis, University of Virginia, 1993, Aug. 1993, 139 pp.

Hayter, Mark David, "A Workstation Architecture to Support Multimedia," Ph.D. Thesis, University of Cambridge, 1993, Sep. 1993, 111 pp.

Kay, Jonathan and Pasquale, Joseph, The Importance of Non-Data Touching Processing Overheads in TCP/IP, ACM Computer Communication Review, vol. 23, No. 4, pp. 259-268, 1993, Oct. 1993, 10 pages.

Leland, W. E., et al., On the Self-Similar Nature of Ethernet Traffic, ACM Computer Communication Review, vol. 23, No. 4, pp. 85-95, 1993, Oct. 1993, 11 pages.

Thekkath, C. A., et al., "Implementing network protocols at user level," ACM Computer Communication Review, vol. 23, No. 4, 1993, Oct. 1993, pp. 64-73.

Singh, Raj K., et al. A Programmable HIPPI Interface for a Graphics Supercomputer, Proceedings of the 1993 ACM/IEEE conference on Supercomputing, p. 452-461, Portland, Oregon, dated Nov. 15, 1993.

Druschel, Peter and Peterson, Larry L., Fbufs: A High-Bandwidth Cross-Domain Transfer Facility, ACM Dperating Systems Review, vol. 27, Issue 5, p. 189-202, 1993, Dec. 1993.

Maeda, Chris and Bershad, Brian, Protocol Service Decomposition for High-Performance Networking, ACM Dperating Systems Review, vol. 27, Issue 5, p. 244-255, 1993, Dec. 1993.

Regnier, Greg, et al. ETA: Experience With An Intel Xeon Processor As A Packet Processing Engine, IEEE Micro, vol. 24, No. 1, p. 24-31, 1994, Jan. 1994, 8 pages.

Vis, J., A Simple LAN Performance Measure, ACM Computer Communication Review, vol. 24, No. 1, pp. 7-11, 1994, Jan. 1994, 5 pages.

Cohen, Danny; Finn, Gregory; Felderman, Robert; and DeSchon, Annette, "Atomic: A High Speed Local Communication Architecture," Journal of High Speed Networks, vol. 3:1 (1994), pp. 1-28.

Finn, Gregory G. and Mockapetris, Paul, "Netstation Architecture Multi-Gigabit Workstation Network Fabric," Proceedings of InterOp '94, Las Vegas, Nevada, May 1994, 9pp.

Wray, Stuart, et al., The Medusa Applications Environment, Proceedings of the International Conference on Multimedia Computing and Systems, p. 265-273, Boston, 1994, May 1994.

"MPI: A Message-Passing Interface Standard," various forum members, Message-Passing Interface Forum, University of Tennessee, Knoxville, 1994, May 5, 1994 (corrected version), 239 pp.

Singh et al., A Programmable Network Interface for a Message-Based Multicomputer, ACM Computer Communication Review, vol. 24, No. 3, p. 8-17, 1994, Jul. 1994.

Druschel, P., et al. "Experiences with a high-speed network adaptor: a software perspective," ACM Computer Communication Review, vol. 24, No. 4, 1994, Oct. 1994, pp. 2-13.

Floyd, Sally, TCP and Explicit Congestion Notification, ACM Computer Communication Review, vol. 24, No. 5, p. 8 -23, 1994, Oct. 1994.

Edwards, A., et al., User-space protocols deliver high performance to applications on a low-cost GB/s LAN, ACM Computer Communication Review, vol. 24, No. 4, pp. 14-23, 1994, Oct. 1994.

Brakmo, L.S., et al., "TCP Vegas: new techniques for congestion detection and avoidance," ACM Computer Communication Review, vol. 24, No. 4, Oct. 1994, p. 24-35.

Romanow, A. and Floyd, S., Dynamics of TCP Traffic over ATM Networks, ACM Computer Communication Review, vol. 24, No. 4, p. 79-88, 1994, Oct. 1994.

Black, R. J.; Leslie, I.; and McAuley, D., Experiences of building an ATM switch for the Local Area, ACM Computer Communication Review, vol. 24, No. 4, p. 158-167, 1994, Oct. 1994.

Falsafi, Babak, et al. Appplication-Specific Protocols for User-Level Shared Memory, Proceedings of the 1994 conference on Supercomputing, pp. 380-389, Washington D.C., Nov. 14, 1994.

Lin, Mengjou, et al., "Performance of High-Speed Network I/O Subsystems: Case Study of A Fibre Channel Network," Proc. 1994 Conf, on Supercomputing, Washington D.C., Nov. 14, 1994, pp. 174-183.

Boden, Nanette J., et al., Myrinet: A Gigabit-per-Second Local-Area Network, Draft of paper published in IEEE Micro vol. 15, No. 1, pp. 29-36, 1995, Nov. 16, 1994.

Sterling, Thomas, et al., Beowulf: A Parallel Workstation for Scientific Computation, Proceedings of the 24th International Conference on Parallel Processing, pp. 11-14, Aug. 1995.

Kleinpaste, K.; Steenkiste, P.; and Zill, B., ACM Computer Communication Review, vol. 25, No. 4, 12 pages, 1995, Oct. 1995.

Partridge, C.; Hughes, J.; and Stone, J., Performance of Checksums and CRCs over Real Data, ACM Computer Communication Review, vol. 25, No. 4, p. 68-76, 1995, Oct. 1995.

Edwards, A. and Muir, S., "Experiences implementing a high performance TCP in user-space," ACM Computer Communication Review, vol. 25, No. 4, 1995, Oct. 1995, pp. 196-205.

Mogul, J. C., "The case for persistent-connection HTTP," ACM Computer Communication Review, vol. 25, No. 4, 1995, Oct. 1995, pp. 299-313.

Von Eicken, Thorsten, et al., U-Net: A User-Level Network Interface for Parallel and Distributed Computing, ACM Dperating Systems Review, vol. 29, Issue 5, p. 109-126, 1995, Dec. 1995.

Tennenhouse, D. L. and Wetherall, D. J., Towards an Active Network Architecture, ACM Computer Communication Review, vol. 26, No. 2, pp. 5-18, 1996, Apr. 1996.

Barham, Paul Ronald, "Devices in a Multi-Service Operating System," Ph.D. thesis, University of Cambridge, 1996, Jul. 1996, 142pp.

(56) References Cited

OTHER PUBLICATIONS

Chang, Chi-Chao, et al., "Low-Latency Communication on the IBM Risc System/6000 SP," Proc. 1996 ACM/IEEE conference on Supercomputing, Pittsburgh, Nov. 17, 1996, 17pp.
Touch, Joe, et al.; "Atomic-2" slides, Gigabit Networking Workshop '97 Meeting, Kobe, Japan, Apr. 1997, 10pp.
Touch, Joe, et al.; "Host-based Routing Using Peer DMA," Gigabit Networking Workshop '97 Meeting, Kobe, Japan, Apr. 1997, 2pp.
Angin, O., et al., Report on the 5th IFIP International Workshop on Quality Service (IWQOS'97), Acm Computer Communication Review, vol. 27, No. 3, pp. 100-117, 1997, Jul. 1997.
Thacker, Charles P. and Stewart, Lawrence C., Firefly: a Multiprocessor Workstation, ACM Operating Systems Review, vol. 21, Issue 4, p. 164-172, 1987, Oct. 1997.
Anderson, Ed, et al.; Proceedings of the 1997 ACM/IEEE conference on Supercomputing, p. 1-17, San Jose, California, Nov. 16, 1997.
Wassermann, Harvey J., et al.; Performance Evaluation of the SGI Origin2000: A Memory-Centric Characterization of LANL ASCI Applications, Proceedings of the 1997 ACM/IEEE conference on Supercomputing, p. 1-11, San Jose, California, Nov. 16, 1997.
Buonadonna, Philip, et al., An Implementation and Analysis of the Virtual Interface Architecture, Proceedings of the 1998 ACM/IEEE conference on Supercomputing, 20 pages, Orlando, Florida, Nov. 7, 1998.
Husbands, Parry and Hoe, James C., MPI-StarT: Delivering Network Performance to Numerical Applications, Proceedings of the 1998 ACM/IEEE conference on Supercomputing, p. 1-15, Orlando, Florida, Nov. 7, 1998.
Warren, Michael S., et al., "Avalon: An Alpha/Linux Cluster Achieves 10 Gflops for $150k," Proc. 1998 ACM/IEEE conference on Supercomputing, Orlando, Florida, Nov. 7, 1998, 10pp.
Salmon, John, et al., "Scaling of Beowulf-class Distributed Systems," Proc. 1998 ACM/IEEE conference on Supercomputing, Orlando, Florida, Nov. 7, 1998, 18pp.
Chiou, Derek; Ang, Boon S., et al., "StarT-Voyager: A Flexible Platform for Exploring Scalable SMP Issues," Proc. 1998 ACM/IEEE conference on Supercomputing, Orlando, Florida, Nov. 7, 1998, 20pp.
Pope, S. L., et al., "Enhancing Distributed Systems with Low-Latency Networking," Parallel and Distributed Computing and Networks, Brisbane, Australia, 1998, Dec. 1998, 12 pages.
De Vivo, et al.; "Internet Vulnerabilities Related to TCP/IP and T/TCP," ACM Computer Communication Review, vol. 29, No. 1, pp. 81-85, Jan. 1999.
Allman, M., "TCP Byte Counting Refinements," ACM Computer Communication Review, vol. 29, No. 3, 1999, Jul. 1999, pp. 14-22.
Muir, Steve and Smith, Jonathan, "Piglet: A Low-Intrusion Vertical Operating System," Technical Report MS-CIS-00-04, University of Pennsylvania, 2000, Jan. 2000, 15pp.
Crowley, Patrick, et al.; Proceedings of the 14th international conference on Supercomputing, pp. 54-65, Santa Fe, New Mexico, May 8, 2000.
Stone, Jonathan and Partridge, Craig, When the CRC and TCP Checksum Disagree, ACM Computer Communication Review, vol. 30, No. 4, pp. 309-319, 2000, Oct. 2000.
Feng, W. and Tinnakornsrisuphap, P., "The Failure of TCP in High-Performance Computational Grids," Proc. 2000 ACM/IEEE conference on Supercomputing, Dallas, Texas, Nov. 4, 2000, 11p.
Hsieh, Jenwei, et al., "Architectural and Performance Evaluation of GigaNet and Myrinet Interconnects on Clusters of Small-Scale SMP Servers," Proc. 2000 ACM/IEEE conference on Supercomputing, Dallas, Texas, Nov. 4, 2000, 9pp.
Pratt, Ian and Fraser, Keir, Arsenic: A User-Accessible Gigabit Ethernet Interface, Proceedings of IEEE Infocom 2001, pp. 67-76, Apr. 22, 2001.
Hrvoje, Bilic, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.

Hrvoye, Bilic, et al.; presentation slides from 9th Symposium on High Performance Interconnects, "Deferred Segmentation for Wire-Speed Transmission of Large TCP Frames over Standard GbE Networks," Aug. 22, 2001, 9pp.
Lowekamp, Bruce, et al., "Topology discovery for large ethernet networks," ACM SIGCOMM Computer Communication Review— Proc. 2001 SIGCOMM conf., vol. 31, No. 4, 2001, Oct. 2001, pp. 237-248.
Ross, Robert, et al., "A Case Study in Application I/O on Linux Clusters," Proc. 2001 ACM/IEEE Conf, on Supercomputing, Denver, 10-Nov. 10, 2001, 17pp.
Blanton, E. and Allman, M., "On Making TCP More Robust to Packet Reordering," ACM Computer Communication Review, vol. 32, No. 1, 2002, Jan. 2002, pp. 20-30.
Crowcroft, Jon and McAuley, Derek, "ATM: A Retrospective on Systems Legacy or 'A technology with a fabulous future behind it?'", ACM Computer Communication Review, vol. 32, No. 5, 2002, Nov. 2002, pp. 11-12.
Kalmanek, Charles, A Retrospective View of ATM, ACM Computer Communication Review, vol. 32, No. 5, pp. 13-19, Nov. 2002.
Smith, Jonathan, The Influence of ATM on Operating Systems, ACM Computer Communication Review, vol. 32, No. 5, pp. 29-37, Nov. 2002.
Bush, R. Bush and Meyer, D., IETF Network Working Group, Request for Comments memo: 3439 [extending RFC1958], Dec. 2002, Some Internet Architectural Guidelines and Philosophy, 25 pp, The Internet Society (c)2002.
Sarolahti, Pasi, et al., "F-RTO: an enhanced recovery algorithm for TCP retransmission timeouts," ACM Computer Communication Review, vol. 33, No. 2, 2003, Apr. 2003, pp. 51-63.
Tom Kelly; "Scalable TCP: Improving Performance in Highspeed Wide Area Networks," ACM Computer Communication Review, vol. 33, No. 2, pp. 83-91, Apr. 2003.
Hurwiiz, Justin and Feng, Wu-chun, "Initial end-to-end performance evaluation of 10-Gigabit Ethernet," Proc. 11th Symposium on High Performance Interconnects, Aug. 20, 2003, pp. 116-121.
Vinay Aggarwal, et al.; "Workshop on network-I/O convergence: experience, lessons, implications (NICELI)," ACM Computer Communication Review, vol. 33, No. 5, pp. 75-80, Oct. 2003.
Liu, Jiuxing, et al., "Performance Comparison of MPI Implementations over InfiniBand, Myrinet and Quadrics," Proc. 2003 ACM/IEEE conference on Supercomputing, Phoenix, Arizona, Nov. 15, 2003, 14 pp. (58-71).
Srihari Makineni and Ravi Iyer; "Architectural Characterization of TCP/IP Packet Processing on the Pentium M Processor," Proceedings of the 10th International Symposium on High Performance Computer Architecture, 11 pages, Feb. 14, 2004.
Currid, Andy, "TCP Offload to the Rescue," ACM Queue, vol. 2, No. 3, 2004, May 1, 2004, pp. 58-65.
Declaration of Dr. Gregory L. Chesson in Support of Microsoft's Opposition to Alacritech's Motion for Preliminary Injunction; United States District Court, Northern District California, San Francisco Division, Case No. 3:04-cv-03284-JSW, filed Feb. 4, 2005, 289 pp including exhibits (declaration is 25 pp).
Lazowska, Edward D. and Patterson, David A., "Computing Research: A Looming Crisis," ACM Computer Communication Review, vol. 35, No. 2, 2005, Jul. 2005, pp. 65-68.
W. Feng, et al.; "Performance Characterization of a 10-Gigabit Ethernet TOE," Proceedings of the 13th Symposium on High Performance Interconnects, pp. 1-6, Aug. 17, 2005.
Leslie, B., et al., "User-level Device Drivers: Achieved Performance," J. Comput. Sci. & Technol., vol. 20, Sep. 2005, Sep. 2005, 17pp.

(56) References Cited

OTHER PUBLICATIONS

Humaira Kamal, et al.; "SCTP versus TCP for MPI," Proceedings of the 2005 ACM/IEEE conference on Supercomputing, Seattle, Washington, 14 pages, Nov. 12, 2005.

H. K. Jerry Chu; "Zero-Copy TCP in Solaris," Proceedings of the USENIX Annual Technical Conference, 13 pages, Jan. 1996.

Calvert, Ken, Reflections on Network Architecture: an Active Networking Perspective, ACM Computer Communication Review, vol. 36, No. 2, pp. 27-30, Apr. 2006.

Crowcroft, Jon, 10 Networking Papers: Recommended Reading, ACM Computer Communication Review, vol. 36, No. 2, pp. 51-52, Apr. 2006.

Minshall, Greg, et al., Flow Labelled IP over ATM: Design and Rationale, ACM Computer Communication Review, vol. 36, No. 3, pp. 79-92, 2006, Jul. 2006, 14 pages.

Wetherall, Davi, 10 Networking Papers: Readings for Protocol Design, ACM Computer Communication Review, vol. 36, No. 3, pp. 77-78, dated 2006, Jul. 2006.

Geoffray, Patrick, "A Critique of RDMA," HPCWire article, Aug. 18, 2006, 7pp. Available at http://www.hpcwire.com/hpcwire/2006-08-18/a_critique_of_rdma-1.html.

Sancho, Jose Carlos, et al., "Quantifying the Potential Benefit of Overlapping Communication and Computation in Large-Scale Scientific Applications," Proc.2006 ACM/IEEE conference on Supercomputing, Tampa, Florida, Nov. 11, 2006, 16pp.

Sur, Sayantan, et al., High-Performance and Scalable MPI over InfiniBand with Reduced Memory Usage: An In-Depth Performance Analysis, Proceedings of the 2006 ACM/IEEE conference on Supercomputing, Tampa, Florida, Nov. 11, 2006, 13 pages.

Pope, Steven and Riddoch, David, 10Gb/s Ethernet Performance and Retrospective, ACM Computer Communication Review, vol. 37, No. 2, pp. 89-92, 2007, Mar. 19, 2007.

Mansley, Kieran, et al., Getting 10 GB/s from Xen: Safe and Fast Device Access from Unprivileged Domains, EuroPar Conference 2007, pp. 224-233, Rennes, France, Aug. 28, 2007.

Kaiserswerth, M., The Parallel Protocol Engine, IEEE/ACM Transactions in Networking vol. 1, Issue 6, pp. 350-663, 1993, Dec. 1993, 14 pages.

Cohen, Danny, et al., The Use of Message-Based Multicomputer Components to Construct Gigabit Networks, ACM Computer Communication Review, vol. 23, No. 4, p. 32-44, 1993, Jul. 1993, 13 pages.

Evans, J. and Buller, T., The End of History, IEEE TCGN Gigabit Networking Workshop, 2001, Apr. 22, 2001.

Mogul, "TCP offload is a dumb idea whose time has come," USENIX Assoc., Proceedings of HotOS IX: The 9th Workshop on Hot Topics in Operating Systems, May 2003, pp. 24-30.

* cited by examiner

MODIFYING APPLICATION BEHAVIOUR

REFERENCE TO RELATED APPLICATIONS

This application is a continuation of U.S. patent application Ser. No. 14/250,290, filed 10 Apr. 2014 by Steven L. Pope, David J. Riddoch and Kieran Mansley, and entitled "MODIFYING APPLICATION BEHAVIOUR, which is a continuation of U.S. patent application Ser. No. 13/283,423, filed 27 Oct. 2011 by Steven L. Pope, David J. Riddoch and Kieran Mansley, and entitled "MODIFYING APPLICATION BEHAVIOUR", now U.S. Pat. No. 8,763,081, issued 24 Jun. 2014, which is a non-provisional of U.S. Provisional Patent Application No. 61/525,980, filed 22 Aug. 2011 by Steven L. Pope, David J. Riddoch and Kieran Mansley, and entitled "MODIFYING APPLICATION BEHAVIOUR, each of which is incorporated herein by reference in their entirety.

BACKGROUND

This application relates to data processing systems having an intercept library configured to intercept calls to an application programming interface (API) so as to allow actions to be performed in response to those calls without requiring modification of the application or API itself. The application also relates to an improved mechanism for filtering received messages suitable for use with a data processing system having such an intercept library.

Generally, applications supported by an operating system will be configured to interact with the operating system and other user-level entities by means of software libraries that are configured to provide an application programming interface (API) to the application. Thus, an API defines a standard set of calls by means of which an application can interact with its software environment. For example, a socket library providing a Berkeley sockets API is typically offered by an operating system in order to facilitate high-level communications to and from an application.

Over time, many APIs have become standardised such that an application installed at an operating system will expect to be able to interact with its environment using a set of standard APIs. This presents the problem that the set of functions provided by an API cannot be modified without breaking the API or requiring that the application is itself modified to utilise a modified set of functions. Thus, whilst standardised APIs have the advantage of widespread compatibility with applications, they make it difficult to accommodate changes to the underlying structure of a data processing system—changes, for example, that might provide significant performance improvements were an API able to present an appropriate set of functions.

This problem is well illustrated by a Berkeley socket library which does not provide a mechanism by which received messages can be filtered by an application prior to the receive processing of those messages at the network protocol stack. Conventionally, in order to avoid received messages having to traverse the network protocol stack prior to filtering, one or both of the application and the socket library would have to be modified in order to accommodate a modified receive mechanism, or filtering would have to be performed at the kernel.

The Solarflare OpenOnload user level network stack uses intercept libraries in order to perform certain fixed socket-related functions, but these intercept libraries do not provide the flexibility to allow the behaviour of an application through an API to be readily modified without requiring modification to the application or API. The Solarflare OpenOnload intercept libraries do not, for example, allow filtering of received messages to be performed at the receive queue without modification to the application and socket API.

There is therefore a need for mechanisms by which an application can take advantage of modifications to the operation of its data processing system without requiring modification of the application itself or one or more APIs defining its software environment. In particular there is a need for mechanisms by which the filtering of messages received for an application can be performed without those messages having to first traverse the network protocol stack and without requiring modification of the application itself or the sockets API.

SUMMARY

Roughly described, according to a first aspect of the first invention there is provided a data processing system comprising: an operating system providing an application programming interface; an application supported by the operating system and operable to make calls to the application programming interface; an intercept library configured to intercept calls of a predetermined set of call types made by the application to the application programming interface; and a configuration data structure defining at least one action to be performed for each of a plurality of sequences of one or more calls having predefined characteristics, the one or more calls being of the predetermined set of call types; wherein the intercept library is configured to, on intercepting a sequence of one or more calls defined in the configuration data structure, perform the corresponding action(s) defined in the configuration data structure.

The predefined characteristics of a sequence of one or more calls can include the type of call(s) and the parameters of the call(s).

The configuration data structure could include a plurality of specifications each defining a sequence of one or more calls having predefined characteristics and the corresponding action(s) to be performed by the intercept library on a sequence of one or more calls having those predefined characteristics being identified by the intercept library.

The configuration data structure could be a code module that includes code of a particular programming language and the intercept library includes an interpreter configured to interpret that programming language. Preferably the code module includes a handler function for each of at least some of the predetermined set of call types such that, on a sequence of one or more calls being intercepted by the intercept library, the intercept library is configured to call the respective handler function and perform the corresponding action(s) defined in that handler function. Suitably at least some of the handler functions invoke routines of the intercept library in order to effect the corresponding action(s). Preferably the action(s) are performed in the context of the last call in the sequence.

The configuration data structure could include object code arranged to provide a plurality of functions and at least some of the action(s) defined in the configuration data structure use the functions defined in the object code. Suitably at least some of the actions defined in the configuration data structure are arranged to cause the intercept library to directly invoke functions of the object code.

At least some of the handler functions of the code module could be arranged to invoke a function of the object code.

The action(s) to be performed for a sequence of one or more calls having predefined characteristics could include one or more of: forwarding the last call in the sequence of one or more calls to the application programming interface with unmodified or modified parameters; suppressing the last call in the sequence of one or more calls such that it is not delivered to the application programming interface; making one or more additional calls to the application programming interface or another application programming interface; writing entries to a log; pinning a thread executed in consequence of the sequence of one or more calls to a particular processor core of the data processing system; and enabling spinning for a thread arranged to execute at the data processing system.

Suitably the application programming interface is a socket library. The predefined characteristics could include characteristics of one or more of the following types: socket identifier; network protocol type; destination address; port number; and source address. The action(s) to be performed for a sequence of one or more calls having predefined characteristics could include one or more of: applying configuration options to a user level network stack; and applying tuning options to a socket in respect of which at least some of the sequence of one or more intercepted calls were made.

Suitably the configuration data structure is further configured to identify the predetermined set of call types and, if the set of call types that the intercept library is configured to intercept does not match the predetermined set of calls types, a script is configured to, prior to initialising the intercept library, cause the intercept library to be recompiled so as to arrange that the set of call types that the intercept library is configured to intercept matches the predetermined set of call types identified in the configuration data structure.

Preferably the configuration data structure is supplied by a user.

Preferably the intercept library is a shared object or dynamic linked library.

According to a second aspect of the first invention there is provided a method of modifying the operation of calls to an application programming interface comprising: intercepting calls of a predetermined set of call types from an application to the application programming interface; matching in the intercepted calls one of a plurality of sequences of one or more calls having predefined characteristics, the plurality of sequences of one or more calls being defined by a configuration data structure; and in response to matching a sequence of one or more calls, performing a set of at least one corresponding actions defined in the configuration data structure.

According to the second invention there is provided a data processing system comprising: an operating system providing a socket library; an application supported by the operating system and configured to receive messages at a socket established by means of the socket library; a user level network protocol stack operable to perform receive processing of messages held at a receive queue corresponding to the said socket; and a callback function operable to determine on behalf of the application whether to discard a message held at the receive queue; wherein the application is operable to make a plurality of different calls of a first type to the socket library that cause state of the receive queue of the said socket to be revealed and the callback function is registered with the user level network protocol stack such that, in response to calls of the first type, the user level network protocol stack invokes the callback function in respect of each message held at the receive queue so as to cause the callback function to indicate to the user level network protocol stack whether each respective message at the receive queue is to be discarded.

Preferably the socket library is configured to offer a set of functions in accordance with a standard Berkeley sockets API. Preferably the first type of calls includes: recv( ), recvfrom( ), recvmsg( ), select( ), pselect( ), poll( ), ppoll( ), epoll_wait( ), epoll_wait( ), read( ), readv( ), pread( ), getsockopt( ), and ioctl( ).

Preferably the user level network protocol stack is configured to, in response to an indication from the callback function that a message is to be discarded, cause that message to be discarded.

Suitably the state of the receive queue includes one or more of: whether the receive queue is empty, the number of messages held in the receive queue, and the messages themselves.

Preferably the callback function is configured to return a value indicating whether the message in respect of which the callback function was invoked is to be discarded.

Preferably the user level network protocol stack is configured not to invoke the callback function if the receive queue is empty.

Preferably the receive queue comprises an unfiltered queue and a filtered queue, the unfiltered queue initially receiving all messages for the socket, and the user level network protocol stack is configured to move from the unfiltered queue into the filtered queue only those messages that are not indicated to be discarded. Preferably the user level network protocol stack is configured to not invoke the callback function if there are messages in the filtered queue.

Alternatively the user level network protocol stack is configured to, in response to an indication that a message is to be discarded, set a flag for that message in the receive queue indicating that the message is to be discarded.

The call of the first type could be a recv( ) call and the user level network protocol stack would be configured to provide to the socket only those messages that are indicated not to be discarded.

Suitably the application is configured to register the callback function for a socket in response to making a call to create that socket. The callback function could be provided by the application.

Preferably the data processing system further comprises: an intercept library configured to intercept calls made by the application to the application programming interface; and a configuration data structure arranged to cause the intercept library to register the callback function in response to intercepting a sequence of one or more calls having predefined characteristics defined in the configuration data structure. Preferably the sequence of one or more calls is a single call to create a new socket, and the callback function is registered in respect of the newly created socket.

Suitably the configuration data structure includes object code and the callback function is provided by the object code. Alternatively the callback function could be provided by the intercept library.

Suitably the callback function is further operable to, on performing filtering of a message in the receive queue, return data by means of the callback function indicating one or more sub-messages within that message that are to be delivered to the socket, the remaining parts of the message to be discarded. The one or more sub-messages could be indicated by means of byte ranges of the message in the receive queue.

Suitably the callback function is further configured to, on performing filtering of a message in the receive queue, modify that message so as to bring the message into accordance with a predetermined network protocol.

Suitably the callback function is further configured to receive an indication of the number of filtered messages in the receive queue and, if the number of filtered messages exceeds a predetermined threshold, cause the rate of delivery of messages into the receive queue to be reduced and/or an error state to be indicated to the application.

The socket library could be arranged to support one or more of: inter-process communications at the operating system; inter-process communications at processes supported at different operating systems of the data processing system; and communications between remote processes at different data processing systems connected by means of a network.

According to a second aspect of the second invention there is provided a method of filtering messages at a receive queue of a data processing system, the receive queue being configured to receive messages for a socket of an application and the socket being established by means of a socket library, the data processing system further comprising a user level network protocol stack operable to perform receive processing of messages held at the receive queue, the method comprising: registering a callback function such that, in response to calls from the application to the socket library that cause state of the receive queue of the socket to be revealed, the user level network protocol stack invokes the callback function in respect of each message held at the receive queue, the callback function being arranged to indicate to the user level network protocol stack whether each respective message at the receive queue is to be discarded; and discarding those messages indicated the user level network protocol stack as being for discarding.

DESCRIPTION OF THE DRAWINGS

The present inventions will now be described by way of example with reference to the accompanying drawings, in which.

DETAILED DESCRIPTION

The following description is presented to enable any person skilled in the art to make and use the inventions, and is provided in the context of a particular application. Various modifications to the disclosed embodiments will be readily apparent to those skilled in the art.

The general principles defined herein may be applied to other embodiments and applications without departing from the spirit and scope of the present inventions. Thus, the present inventions are not intended to be limited to the embodiments shown, but is to be accorded the widest scope consistent with the principles and features disclosed herein.

The first invention relates to an intercept library configured to intercept calls from an application to an application programming interface (API) and perform user-defined actions in response to calls having predetermined characteristics without requiring modification of the application itself.

Figure 1:
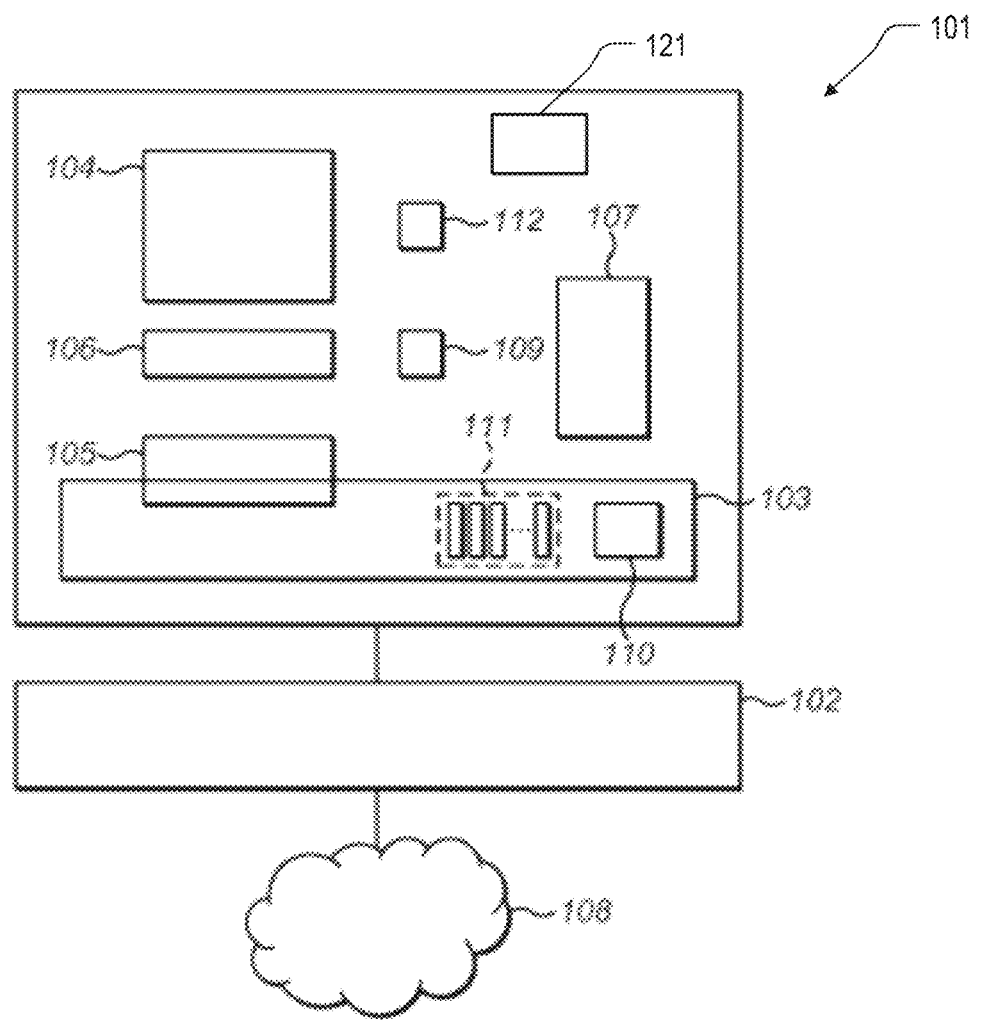
FIG. 1 shows a data processing system configured in accordance with the present inventions.

FIG. 1 illustrates a data processing system 101 configured in accordance with the present inventions. The data processing system comprises a processor 121 and an operating system 103 arranged to support an application 104. The operating system provides an application programming interface 105 to which the application may make function calls. The API 105 preferably executes at user level, though it could alternatively execute at kernel level. In accordance with the teaching of the first invention, data processing system 101 further comprises an intercept library 106 configured to intercept function calls from application 104 to API 105.

In the example shown in FIG. 1, API 105 is a network socket API by means of which an application 104 can send and receive data. Such data communication could be between a process of application 104 and another process supported by operating system 103, between a process of application 104 and a process supported at another operating system of the data processing system, or between a process of application 104 and a remote process accessible over network 108 by means of network interface device 102. However, an intercept library as described herein is not limited to being used with a socket API and the first invention finds general application to APIs of all kinds.

The behaviour of intercept library 106 will now be described by reference to FIG. 1. Intercept library 106 is configured to intercept certain function calls made by application 104 to socket API 105 and identify sequences of one or more intercepted function calls having predetermined characteristics that are defined in a configuration data structure 109 accessible to the intercept library. The configuration data structure further defines one or more predetermined actions that are to be performed by the intercept library in response to it intercepting such a sequence of one or more function calls. Thus, the configuration data structure defines sequences of one or more function calls having predetermined characteristics that are to be matched by the intercept library and, for each such sequence, one or more predetermined actions that are to be performed by the intercept library in response to that sequence of one or more function calls being intercepted The configuration data structure could be any kind of data structure, such as a flat file or database.

The set of calls that the intercept library is configured to intercept is typically determined prior to compilation of the library. It can therefore be advantageous to arrange that the intercept library can be recompiled prior to its initialisation so as to intercept a predetermined set of calls indicated in the configuration data structure. This can be arranged by having a script check the set of calls that the intercept library is configured to intercept and, if the set of calls that the intercept library is configured to intercept does not match the predetermined set of calls indicated in the configuration data structure, cause the intercept library to be recompiled so as to update the intercept library to intercept the predetermined set of calls indicated in the configuration data structure.

A sequence of one or more function calls defined in the configuration data structure could be, for example: a single send( ) call to a TCP socket, such that an action is performed for each TCP send( ) call that is intercepted; calls to a particular socket, such that an action is performed for all intercepted calls to that socket; a socket( ) call to create a UDP socket, such that an action is performed for all intercepted calls to create UDP sockets; a set of n or more calls to a particular socket, such that an action is performed in respect of each such set of n intercepted calls.

These are merely examples and, more generally, any sequence of one or more function calls having any characteristics could be specified in the configuration data structure. A sequence comprising a plurality of calls need not be a set of consecutive calls and might instead be, for example, a sequence of calls to the same socket (i.e. there could be additional calls between calls to that socket which do not form part of the sequence because they are not directed to that socket).

Once a sequence of one or more intercepted calls has been identified, the intercept library performs the one or more actions specified in the configuration data structure for that sequence. The actions could be, for example: invoking the intercepted call(s) with the original or modified parameters so as to cause the call(s) to be passed to API 105; suppressing the intercepted call(s) so as to prevent the call(s) being passed to API 105; causing additional calls to be made before or after the intercepted call to API 105 or other APIs of the system; writing entries to a log describing one or more aspects of the intercepted call(s); accumulating statistics relating to one or more aspects of the intercepted call(s); pinning a thread to a particular CPU core or set of CPU cores, the thread being one that is to execute as a consequence of the intercepted call(s); causing a socket to be associated with a particular user level network stack 107 of the system; applying tuning options to a thread that is to execute as a consequence of the intercepted call(s)—e.g. spinning could be enabled/disabled for a lock of the thread; applying tuning options to user level network stack 107 that is to perform processing as a consequence of the intercepted call(s)—e.g. disabling or enabling interrupt-based processing for the user level stack; applying tuning options to a socket in respect of which the intercepted call(s) is raised—e.g. enabling the TCP_NODELAY option of a socket so as to disable Nagle's algorithm for the socket; invoking code defined in the configuration data structure (see the second and third embodiments below).

Typically, function calls to socket library 105 will cause kernel network protocol stack 110 or user level network protocol stack 107 to process data to be transmitted from or received at a socket of the system, or to in some more general manner handle data flows associated with one or more sockets of the system. A user level network protocol stack could itself be configured to intercept certain calls to API 105 so as to cause data flows in respect of the intercepted socket calls to be handled at the user level network protocol stack. Thus, an intercept library causes certain calls from application 104 to socket API 105 which conventionally pass straight through to the socket library:

application → libsocket.so to be intercepted at the intercept library:

application → libintercept.so → libsocket.so though the calls could be further intercepted by a library of the user level network stack 107:

application → libintercept.so → libuserstack.so → libsocket.so

In a first embodiment of the first invention, configuration data structure 109 comprises sets of specifications, each specification specifying (a) characteristics that are to be identified by the intercept library 106 in a sequence of one or more intercepted function calls and (b) one or more actions to be performed by the intercept library on those characteristics being identified. For example, the configuration data structure could contain specifications of the following form:

socket(PF_INET, SOCK_DGRAM, *): protocol_stack= userlevelstack

A specification consists of two parts: a match specification that defines the sequence and characteristics of the socket calls that are to be matched, and an action specification that defines what should be done when a match is found. The example specification above causes the intercept library to match calls to the socket( ) function call to create UDP sockets and, when a match is found, directs the intercept library to cause the new socket to be created in the user level network protocol stack 107. A sequence of two or more calls could be specified by a match specification that defines the characteristics of each of the series of socket calls that are to be matched. It is envisaged that the intercept library is configured to perform matching of function calls on the basis of call parameters using wildcard operators as is well known in the art.

In a second embodiment of the first invention, intercept library 106 includes an interpreter and configuration library 109 is a code module configured for execution by the interpreter. For example, the intercept library could include a Python interpreter and the configuration library could be a Python code module.

The intercept library intercepts those calls for which a handler function is specified in code module 109 and, for each sequence of one or more intercepted calls, the interpreter of the intercept library is invoked to execute the respective handler function of the code module. For example, if a handler is supplied for a socket( ) function call then when the intercept library intercepts socket( ) calls it executes the respective handler function defined in the code module. A handler function could, for example, perform any of the actions described above in relation to the first embodiment and, since a handler function can include arbitrary code, a handler function can further perform any action that can be effected by means of the particular programing language in the software environment of the data processing system.

A handler function of the code module 109 can be configured to invoke library routines of the intercept library itself so as to cause the required actions to be performed for a given sequence of one or more intercepted calls. For example, the intercept library could be configured to provide one or more standard functions that a handler might wish to call, with a handler function being configured to invoke a standard function of the intercept library with those parameters necessary to cause the respective action to be performed for a given sequence of one or more intercepted calls. Those calls for which no handler function is defined in the code module are forward onto socket library 105.

A configuration data structure configured in accordance with the first or second embodiments could further include object code (e.g. machine code) that can be executed directly without requiring the intercept library to include an interpreter for the code. For example, the object code could be a compiled C library. By including a code library, the configuration data structure can provide a set of functions that can be invoked as actions by the intercept library on intercepting a sequence of one or more calls to API 105. A configuration data structure could include object code in a single file along with a set of specifications (of the first embodiment) or a code module (of the second embodiment), or the configuration data structure could include object code in one or more separate object code libraries identified by the configuration data structure.

Thus, in accordance with the first embodiment, actions defined in a specification held in the configuration data structure could include causing the intercept library to invoke a function of the object code. For example, a specification could include a reference to a function of a user-supplied object code library that is to be invoked as an action if the match part of the specification is satisfied by a sequence of one or more intercepted calls. And, in accordance with the second embodiment, actions defined in the code module could include function calls to the object code so as to cause the intercept library to invoke a function of the object code on running the interpreted code. Functions of the object code would typically be identified through a combination of the name of the library comprising the object code and the name of the entry-point (i.e. function) within the library.

The first invention therefore provides an arrangement by which the behaviour of an application with respect to an API can be modified without requiring modification of the application itself. This is achieved through the use of an intercept library configured to intercept calls to an API and one or more configuration data structures in dependence on which the intercept library (a) matches certain sequences of one or more intercepted calls and (b) performs certain actions in dependence on matching those sequences of one or more calls. A configuration data structure is preferably provided by a user so as to allow the user to control the behaviour of the application with respect to the API—for example, by applying tuning to calls made to a socket library in order to improve the performance of transmitting and receiving data over sockets of the data processing system. It is advantageous if the configuration data structure is provided as a code module and the intercept library with an interpreter so as to allow the user to specify any arbitrary code as actions to be performed on intercepting a call. It is most preferable that the configuration data structure includes an object code library defining one or more functions that can be called as actions by the intercept library—compiled object code is generally less limited in what it can achieve within a given software environment than interpreted code, and the performance of object code is higher.

The second invention relates to an improved mechanism for filtering received messages and will now be described with reference to FIG. 1.

Messages for an endpoint of data processing system 101 are delivered into receive queues 111. Such messages could be received over network 108 by means of network interface device 102, or could be received from processes supported at the same data processing system—whether at the same or a different operating system (e.g. inter-process communications or communications over virtual networks). The second invention relates to messages received at a queue and it is not important where the message originated.

It is often the case that not all messages received at a queue will be wanted by the endpoint to which they are directed (e.g. application 104). Applications will therefore conventionally filter messages and discard those that are unwanted. All work expended on the message up to the point of discard is effectively wasted. The second invention, however, teaches that some of this wasted work can be avoided by registering a callback function 112 with a user level network stack 107 such that message filtering is performed in the context of the network stack whilst the message is located in the receive queue. Such a callback is registered on any sockets for which filtering is to be performed by the mechanism described herein.

The callback function could be provided by application 104 or in separate object code (for example in the object code of the configuration data structure or intercept library of the first invention). If the callback function is separate to the application, it is configured to perform filtering of messages at a receive queue 111 on behalf of the application—this requires that the callback function understands the usage scenario of the application and can perform filtering accordingly. Importantly, the socket API provided by the operating system does not require any modification in order for filtering to be performed at user level because the callback is registered at the user level protocol library such that the callback is invoked for a socket as a consequence of standard API calls that reveal the state of the receive queue of that socket. For example, a standard recv( ) call to the socket API is arranged to cause the user level network stack to invoke the callback on performing receive processing as a consequence of the recv( ) call. Calls that reveal the state of a receive queue cause the state of the receive queue to be touched by threads/processes executing at the data processing system. Calls that reveal the state of a receive queue can reveal the number of messages at the receive queue, and/or whether the receive queue is empty or not. Calls that reveal the state of a receive queue need not reveal all of the state associated with that queue and may reveal only some of the state of a receive queue—i.e. the calls reveal state of the receive queue.

This arrangement has significant performance advantages since the overhead of providing the message to the application buffer by means of socket library 105 is avoided. Receiving a message at an application incurs significant overheads associated with the socket library API and synchronisation, and also involves copying the message from the receive queue (generally a DMA buffer) into the application buffer. Inspecting each message via a callback avoids the copy step and can amortise the socket API and synchronisation overheads over multiple messages. This reduces CPU burden and reduces pollution of the processor caches.

Network stack 107 is arranged to invoke the callback function prior to messages being copied from the receive queue of a socket into the application buffer. This is preferably achieved by invoking the callback function in response to calls to the socket library that cause messages to be delivered into the application buffer—for example, recv( ) read( ) or recvfrom( )—or reveal the state of the receive queue of a socket—for example, poll( ). Alternatively this could be achieved by invoking the callback function in response to notification of the arrival of messages at the stack.

A value returned by the callback function indicates to the network stack whether the message in respect of which the callback function was invoked should be discarded. If the value returned by the callback function indicates that the respective message should be discarded then the user level network stack 107 discards the message at the receive queue so as to prevent the message being delivered to the application 104.

Figure 2:
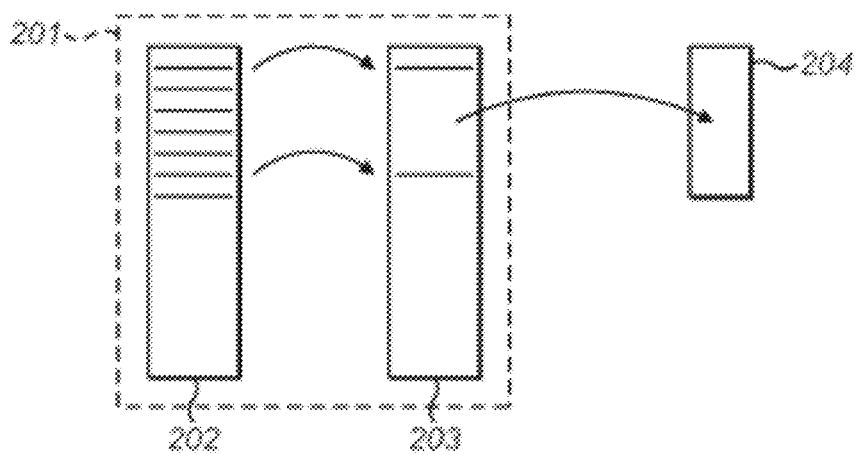
FIG. 2 illustrates a preferred mechanism by which a user level network stack can discard unwanted messages in accordance with the second invention.

A preferred mechanism by which the user level network stack can discard unwanted messages is illustrated in FIG. 2. Each receive queue 201 for which the callback filtering mechanism described herein is used actually comprises two queues: an unfiltered queue 202 into which messages are initially received, and a filtered queue 203 into which only those messages that are not to be discarded are moved. The user level network stack 107 is arranged to provide messages in filtered queue 203 but not messages in unfiltered queue 202 to application buffer 204. Unwanted messages in the unfiltered queue can be marked for deletion.

Alternatively, a receive queue of a socket can be a single queue in which filtered messages that are unwanted are marked as such by means of a flag written to those messages.

By registering a callback at the user level protocol library such that the callback is invoked for a socket as a consequence of standard API calls that reveal the state of the receive queue of that socket, the second invention can be used with a conventional sockets API 105 (e.g. a standard BSD sockets API). Thus, filtering is transparent to the application and received messages are delivered to the application in the same manner with and without filtering— the only difference being that unwanted messages never reach the application.

For example, an application can use a poll( ) call to socket library 105 to determine whether a socket's receive queue is empty or not. Since a poll( ) call reveals the state of the receive queue of a socket, the poll( ) call could return an incorrect result to the application indicating that there are messages for the application when in fact those messages are to be discarded (i.e. are present in an unfiltered queue or are flagged as discarded). The second invention addresses this problem by registering a callback function with the user level network protocol stack such that the callback is invoked when a call to the socket library is made that reveals the state of a socket's receive queue. Thus, the callback function is invoked when a poll( ) call is made so as to ensure that unfiltered messages are filtered in order to identify whether any filtered messages remain. Preferably the callback is only invoked if required—i.e. it is not invoked if the receive queue for the socket is empty, or if filtering of the receive queue has already been completed. Thus, in the particular case of a poll( ) call, the callback is also preferably only invoked if there are no filtered messages and the receive queue is not empty, since in both these cases the correct response to the poll( ) call is known. When the callback function is invoked for a receive queue in consequence of a poll( ) call being made, the function is invoked for successive unfiltered messages until a message is found that is not to be discarded.

Two mechanisms by which the second invention can be achieved will now be described. Firstly, application 104 can be configured to register the callback function with the user level network stack 107 for one or more sockets of the system. This requires that the application is modified to perform this step on creation of a socket. Under this mechanism, the callback function could be provided by the application itself.

Secondly, and preferably, the first and second inventions are combined and the intercept library 106 is configured to register the callback function with the user level network stack 107 for those sockets of the system to which the filtering mechanism is to be applied. Thus, an intercept library is provided to intercept calls made by the application to the application programming interface in dependence on a configuration data structure. The configuration data structure is arranged to cause the intercept library to register the callback function as an action in response to intercepting a sequence of one or more calls having predefined characteristics defined in the configuration data structure. Preferably, the configuration data structure is configured to cause the intercept library to intercept calls to the socket library 105 that cause a new socket to be created (e.g. socket( ) calls) and register the callback function as an action in respect of the new socket. Alternatively, the registration could be performed at a later point for an existing socket. The registration links the callback function to the receive path of stack 107 such that the callback function is invoked prior to messages being dequeued from the receive queue and to any other code paths of the stack 107 that would be executed as a consequence of calls being made to the API that reveal the state of the receive queue. The callback function 112 could be provided at object code of the configuration data structure.

By registering the callback function in all code paths of the stack 107 that would be executed as a consequence of calls being made to the API that reveal the state of the receive queue, all calls to the socket library are handled correctly for sockets for which filtering is enabled without requiring modification to the socket library or application. In other words, the application can make the same standard calls to the socket library and the socket library can be the same standard socket library that is conventionally provided by the operating system, yet, through the use of the novel intercept library arrangement described herein, message filtering can be performed at user level and not in the kernel. The configuration data structure is preferably arranged to cause the intercept library to register the callback function with stack 107 as an action on a call to create a new socket being intercepted.

Callback function 112 function could be further configured to modify the messages held at receive queue 111, in addition to performing filtering of those messages. For example, the callback function could be configured to reform a message held at the receive queue in accordance with a predetermined protocol so as to render the message into a format understood by the application.

The callback function could be extended so as to provide in data returned by the function information indicating which byte ranges within a received message at the receive queue are to be delivered to the application. This allows filtering of sub-messages within each message held at the receive queue. For example, a message at the receive queue may include two or more application-level messages or parts of messages; by providing data indicating byte ranges within the messages, the callback function can indicate which sub-messages of a message are wanted by the endpoint application.

It can also be useful if the number of filtered (and optionally unfiltered) messages in the receive queue is provided to the callback function. This allows the callback function to determine whether the application is keeping up with the incoming message rate and, if it is not keeping up, to respond accordingly—for example, by causing the rate of delivery of messages into the receive queue to be throttled back (this can be achieved by several well-known mechanisms, including various quality of service protocols). This can be useful if the application performs electronic trading: the information provided to by means of the callback function allows the callback function to cause the trading application to stop trading if it is not keeping up with the influx of messages into its receive queue so as to avoid the application making trades based on out-of-date trading data.

Figure 3:
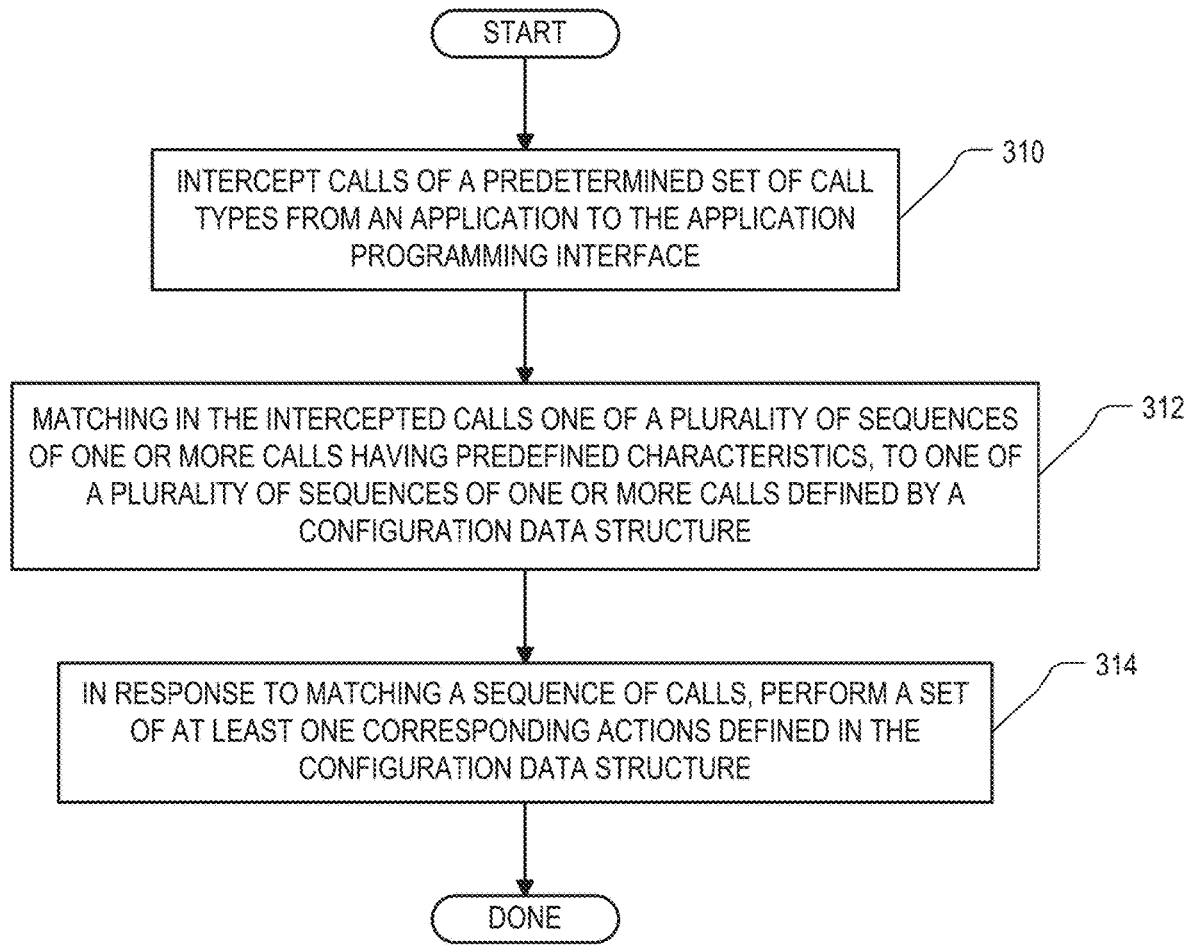
FIG. 3 illustrates a method of modifying the operation of calls to an application programming interface.

FIG. 3 illustrates a method of modifying the operation of calls to an application programming interface. In step 310, calls of a predetermined set of call types are intercepted from an application to the application programming interface. In step 312, the system matches in the intercepted calls one of a plurality of sequences of one or more calls having predefined characteristics, to one of a plurality of sequences of one or more calls defined by a configuration data structure. In step 314, in response to matching a sequence of calls, a set of at least one corresponding actions defined in the configuration data structure is performed.

Figure 4:
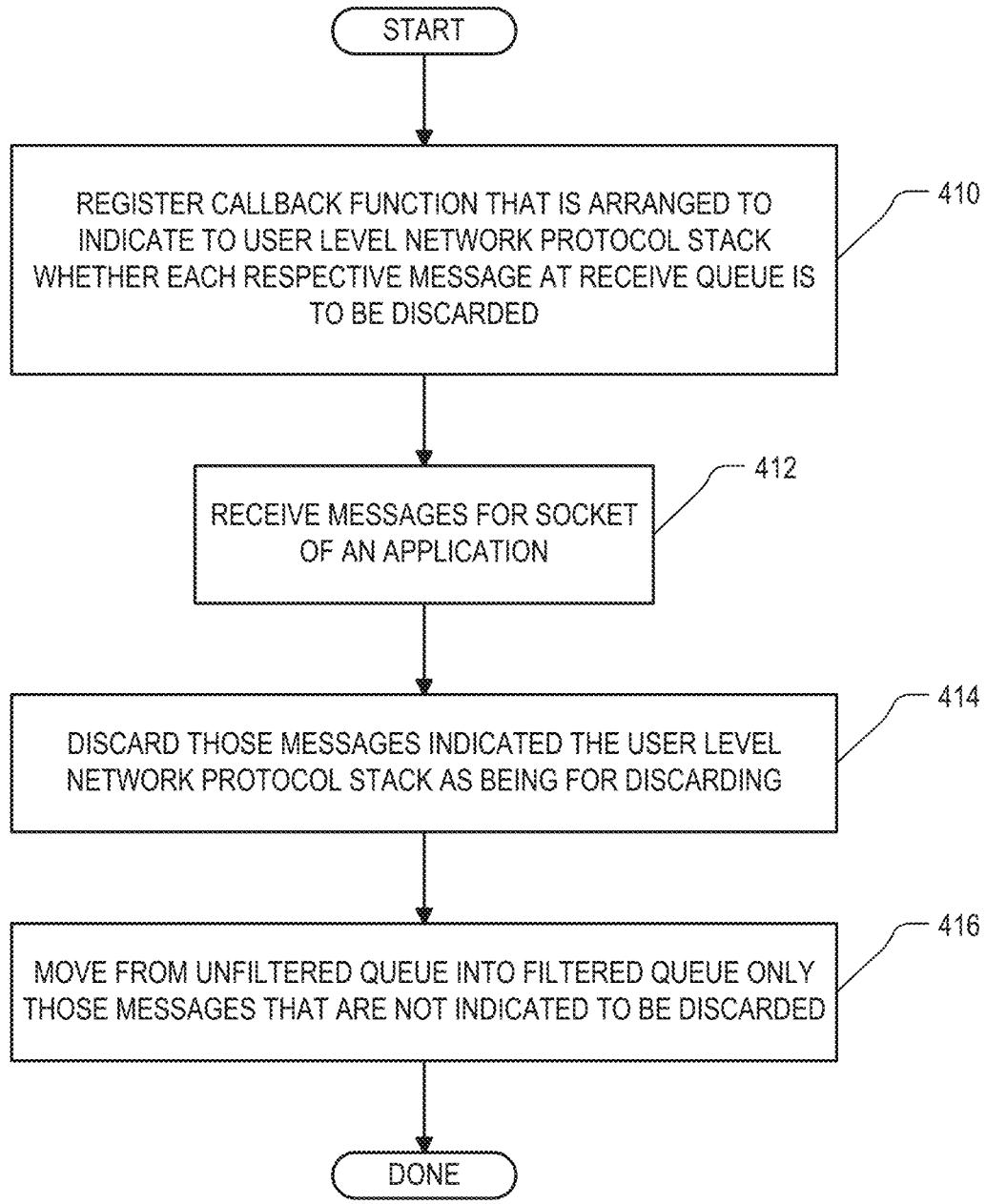
FIG. 4 illustrates a method of filtering messages at a receive queue of a data processing system.

FIG. 4 illustrates a method of filtering messages at a receive queue of a data processing system. In step 410, a callback function is registered, that is arranged to indicate to user level network protocol stack whether each respective message at receive queue is to be discarded. In step 412, messages are received for a socket of an application. In step 414, those messages indicated by the user level network protocol stack as being for discarding, are discarded. In step 416, only those messages that are not indicated to be discarded are moved from unfiltered queue into filtered queue.

A data processing system could be any kind of computing device such as a server, personal computer or handheld device. The present inventions find general application to operating systems that utilise sockets and any references to Berkeley sockets or BSD are not to be taken as limiting the scope of the present invention to the Berkeley Software Distribution (BSD) operating system.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present inventions may consist of any such individual feature or combination of features. In view of the foregoing description it will be evident to a person skilled in the art that various modifications may be made within the scope of the inventions.

The invention claimed is:

1. A data processing system comprising at least one processor, and at least one memory including computer program code, wherein the at least one memory and the computer program code are configured, with the at least one processor, to provide:
an operating system providing an application programming interface (API);
an application supported by the operating system and operable to make calls directed to the API of the operating system;
an intercept library configured to intercept calls before the call arrives at the API, the calls being made by the application to the API of the operating system; and
at least one handler function defining at least one action to be performed for each of a plurality of calls, wherein each handler function of the at least one handler function is associated with a type of function of a plurality of different types of functions performable with respect to a socket in response to calls,
wherein the intercept library is configured to:
on intercepting a call from the application directed to the API of the operating system before the call arrives at the API and specifying a first type of function of the plurality of different types of functions (i) determine that a code module includes a respective handler function associated with the first type of function, (ii) call the respective handler function-to perform at least one action defined in the respective handler function, and (iii) subsequent to calling the respective handler function associated with the function type of the intercepted call, forward the intercepted call to a socket library; and
on intercepting a subsequent call directed to the API of the operating system and specifying a second type of function of the plurality of different types of functions (i) determine that the code module does not include a respective handler function associated with the second type of function and (ii) in response to determining that the code module does not include a respective handler function associated with the second type of function, forward the subsequently intercepted call to the API at a user level.

2. A data processing system as claimed in claim 1, wherein the at least one memory and the computer program code are configured, with the at least one processor, to provide a configuration data structure that includes a plurality of specifications each defining a sequence of one or more calls having predefined characteristics and a corresponding action to be performed by the intercept library on a sequence of one or more calls having those predefined characteristics being identified by the intercept library.

3. A data processing system as claimed in claim 2, wherein the configuration data structure is supplied by a user.

4. A data processing system as claimed in claim 2, wherein the configuration data structure includes object code arranged to provide a plurality of functions and at least some action defined in the configuration data structure use the functions defined in the object code.

5. A data processing system as claimed in claim 4, wherein at least some of the actions defined in the configuration data structure are arranged to cause the intercept library to directly invoke functions of the object code.

6. A data processing system as claimed in claim 2, wherein the configuration data structure is a code module that includes code of a particular programming language and the intercept library includes an interpreter configured to interpret that programming language.

7. A data processing system as claimed in claim 6,
wherein the code module includes the at least one handler function, wherein the configuration data structure includes object code arranged to provide a plurality of functions and at least some action defined in the configuration data structure use the functions defined in the object code,
wherein one or more of the at least one handler function of the code module being arranged to invoke a function of the object code.

8. A data processing system as claimed in claim 1, wherein one or more of the at least one handler function invoke routines of the intercept library in order to effect a corresponding action.

9. A data processing system as claimed in claim 1, wherein the at least one action is performed in the context of the last call in a sequence of calls.

10. A data processing system as claimed in claim 1, wherein the API is a socket library.

11. A data processing system as claimed in claim 1, wherein the respective handler function is configured to perform an action with respect to the intercepted call in dependence upon parameters of the calls.

12. A data processing system as claimed in claim 1, wherein the respective at least one handler function is configured to perform an action with respect to the intercepted calls in dependence upon one or more predefined characteristics comprising one or more of: a socket identifier; a network protocol type; a destination address; a port number; and a source address.

13. A data processing system as claimed in claim 1, wherein the action to be performed for a call include one or more of: applying configuration options to a user level network stack; and applying tuning options to a socket in respect of which at least some of the intercepted calls were made.

14. A data processing system as claimed in claim 1, wherein the intercept library is a shared object or dynamic linked library.

15. A data processing system of claim 1, wherein the at least one action performed by the respective handler function includes parameters that are different than parameters intended for the API as included in the intercepted call.

16. A method of modifying how calls to an application programming interface, provided by an operating system, operate, comprising:
   intercepting calls made from an application directed to the application programming interface (API) of the operating system, wherein at least one handler function defines at least one action to be performed for each of a plurality of calls, each handler function of the at least one handler function being associated with a type of function of a plurality of different types of functions performable with respect to a socket in response to calls;
   matching an intercepted call from the application directed to the API of the operating system, before the call arrives at the API of the operating system, with a call specifying a first type of function of the plurality of different types of functions; and
   in response to matching the intercepted call, (i) determining that a code module includes a respective handler function associated with the first type of function, (ii) calling the respective handler function to perform at least one action defined in the respective handler function and (iii) subsequent to calling the respective handler function associated with the function type of the intercepted call, forwarding the intercepted call to a socket library;
   matching a subsequently intercepted call directed to the API of the operating system with a call specifying a second type of function of the plurality of different types of functions; and
   in response to matching the subsequently intercepted call, (i) determining that the code module does not include a respective handler function associated with the second type of function and (ii) in response to determining that the code module does not include a respective handler function associated with the second type of function, forwarding the subsequently intercepted call to the API at a user level.

17. A data processing system comprising at least one processor, and at least one memory including computer program code, wherein the at least one memory and the computer program code are configured, with the at least one processor, to provide:
   an operating system providing a socket library;
   an application supported by the operating system and configured to receive messages at a socket established by means of the socket library;
   a user level network protocol stack operable to perform receive processing of messages held at a receive queue corresponding to said socket; and
   a first function operable to determine on behalf of the application whether to discard a message held at the receive queue;
   wherein the application is operable to make a plurality of different calls of a first type to the socket library that cause state of the receive queue of said socket to be revealed and the first function is registered with the user level network protocol stack such that, in response to calls of the first type, the user level network protocol stack invokes the first function in respect of each message held at the receive queue so as to cause the first function to indicate to the user level network protocol stack whether each respective message at the receive queue is to be discarded, and
   wherein the user level network protocol stack is configured to provide packets that are not indicated to be discarded to a buffer of the application for delivery to the application.

18. A data processing system as claimed in claim 17, wherein the socket library is configured to offer a set of functions in accordance with a standard Berkeley sockets API.

19. A data processing system as claimed in claim 17, wherein the first type of calls includes: recv( ), recvfrom( ), recvmsg( ), select( ), pselect( ), poll( ), ppoll( ), epoll_wait( ), epoll_pwait( ), read( ), readv( ), pread( ), getsockopt( ), and ioctl( ).

20. A data processing system as claimed in claim 17, wherein the user level network protocol stack is configured to, in response to an indication from the first function that a message is to be discarded, cause that message to be discarded.

21. A data processing system as claimed in claim 17, wherein the state of the receive queue includes one or more of: whether the receive queue is empty, the number of messages held in the receive queue, and the messages themselves.

22. A data processing system as claimed in claim 17, wherein the first function is configured to return a value indicating whether the message in respect of which the first function was invoked is to be discarded.

23. A data processing system as claimed in claim 17, wherein the user level network protocol stack is configured not to invoke the first function if the receive queue is empty.

24. A data processing system as claimed in claim 17, wherein the user level network protocol stack is configured to, in response to an indication that a message is to be discarded, set a flag for that message in the receive queue indicating that the message is to be discarded.

25. A data processing system as claimed in claim 17, wherein the call of the first type is a recv( ) call and the user level network protocol stack is configured to provide to the socket only those messages that are indicated not to be discarded.

26. A data processing system as claimed in claim 17, wherein the application is configured to register the first function for a socket in response to making a call to create that socket.

27. A data processing system as claimed in claim 17, wherein the first function is provided by the application.

28. A data processing system as claimed in claim 17, wherein the at least one memory and the computer program code are configured, with the at least one processor, to provide:
   an intercept library configured to intercept calls made by the application to the application programming interface; and
   a configuration data structure arranged to cause the intercept library to register the first function in response to intercepting a sequence of one or more calls having predefined characteristics defined in the configuration data structure.

29. A data processing system as claimed in claim 28, wherein the sequence of one or more calls is a single call to create a new socket, and the first function is registered in respect of the newly created socket.

30. A data processing system as claimed in claim 28, wherein the configuration data structure includes object code and the first function is provided by the object code.

31. A data processing system as claimed in claim 28, wherein the first function is provided by the intercept library.

32. A data processing system as claimed in claim 17, wherein the first function is further configured to perform filtering of a message in the receive queue by modifying that message so as to bring the message into accordance with a predetermined network protocol.

33. A data processing system as claimed in claim 17, wherein the first function is further configured to receive an indication of the number of filtered messages in the receive queue and, if the number of filtered messages exceeds a predetermined threshold, cause the rate of delivery of messages into the receive queue to be reduced and/or an error state to be indicated to the application.

34. A data processing system as claimed in claim 17, wherein the socket library is arranged to support one or more of:
    inter-process communications at the operating system;
    inter-process communications at processes supported at different operating systems of the data processing system; and
    communications between remote processes at different data processing systems connected by means of a network.

35. A method of filtering messages at a receive queue of a data processing system, the receive queue being configured to receive messages for a socket of an application and the socket being established by means of a socket library, the data processing system further comprising a user level network protocol stack operable to perform receive processing of messages held at the receive queue, the method comprising:

registering a first function such that, in response to calls from the application to the socket library that cause state of the receive queue of the socket to be revealed, the user level network protocol stack invokes the first function in respect of each message held at the receive queue, the first function being arranged to indicate to the user level network protocol stack whether each respective message at the receive queue is to be discarded; and discarding those messages indicated the user level network protocol stack as being for discarding, wherein the user level network protocol stack is configured to provide packets that are not indicated to be discarded to a buffer of the application for delivery to the application.

* * * * *